(12) United States Patent
Kawabata et al.

(10) Patent No.: US 9,937,465 B2
(45) Date of Patent: Apr. 10, 2018

(54) GAS-PRODUCING APPARATUS AND GAS-PRODUCING METHOD

(71) Applicant: Panasonic Intellectual Property Management Co., Ltd., Osaka (JP)

(72) Inventors: Norihiko Kawabata, Osaka (JP); Kazuya Ushirokawa, Osaka (JP); Yasuhiro Ueyama, Hyogo (JP); Shinji Yoshino, Hyogo (JP); Reiko Taniguchi, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 43 days.

(21) Appl. No.: 15/131,767

(22) Filed: Apr. 18, 2016

(65) Prior Publication Data

US 2016/0332110 A1 Nov. 17, 2016

(30) Foreign Application Priority Data

May 13, 2015 (JP) .................. 2015-097800
Jun. 8, 2015 (JP) .................. 2015-115370

(51) Int. Cl.
*C25B 9/00* (2006.01)
*C25B 9/06* (2006.01)
*C25B 1/04* (2006.01)
*C25B 15/08* (2006.01)
*B01D 53/26* (2006.01)

(52) U.S. Cl.
CPC .............. *B01D 53/26* (2013.01); *C25B 1/04* (2013.01); *C25B 9/00* (2013.01); *C25B 9/06* (2013.01); *C25B 15/08* (2013.01); *Y02E 60/366* (2013.01)

(58) Field of Classification Search
CPC .. C25B 9/00; C25B 9/06; C25B 15/08; C25B 1/04; B01D 53/26
USPC ........................................ 204/278
See application file for complete search history.

(56) References Cited

U.S. PATENT DOCUMENTS

| | | |
|---|---|---|
| 2010/0230278 A1 | 9/2010 | Taruya et al. |
| 2011/0198235 A1 | 8/2011 | Takeuchi et al. |
| 2012/0073525 A1 | 3/2012 | Owens |

FOREIGN PATENT DOCUMENTS

| | | |
|---|---|---|
| EP | 2682663 | 1/2014 |
| JP | 58-189383 | 11/1983 |
| JP | 3335555 B | 10/2002 |

OTHER PUBLICATIONS

The Extended European Search Report dated Sep. 19, 2016 for the related European Patent Application No. 6166957.7.

*Primary Examiner* — Zulmariam Mendez
(74) *Attorney, Agent, or Firm* — Panasonic IP Management; Kerry S. Culpepper (57) ABSTRACT

A gas-producing apparatus that produces hydrogen or oxygen, includes: an electrolysis cell that produces hydrogen and oxygen through electrolysis of water; and a gas-liquid separation device that is connected to the electrolysis cell and that receives the water and the hydrogen or the oxygen, wherein the gas-liquid separation device includes a first chamber and a second chamber, the first chamber and the second chamber are separated by a partition wall, and a lower part of the first chamber and a lower part of the second chamber communicate with one another.

8 Claims, 10 Drawing Sheets

PRIOR ART

GAS-PRODUCING APPARATUS AND GAS-PRODUCING METHOD

TECHNICAL FIELD

The technical field relates to an apparatus for producing hydrogen or oxygen, and a method for producing hydrogen or oxygen. In particular, the technical field relates to an apparatus that produces hydrogen or oxygen through electrolysis of water, and a method therefor.

BACKGROUND

In apparatuses that use hydrogen for a process of washing a semiconductor, apparatuses, such as medical or welding equipment, that use oxygen, and fuel apparatuses that use hydrogen and oxygen together, it is required that the dew point of water vapor contained in the hydrogen or oxygen be a value suitable for the respective purposes.

Therefore, in general, the dew point of water vapor in the supplied hydrogen or oxygen is adjusted to a very low degree, for example, about −40° C., and then, the dew point of water vapor is adjusted by humidification in a preceding step in each apparatus that uses hydrogen or oxygen.

Accordingly, in conventional hydrogen/oxygen-producing apparatuses that produce and collect hydrogen and oxygen through electrolysis of water, it is required that, after the water or water vapor contained in the produced hydrogen or oxygen is once removed, the dew point of water vapor be lowered. Therefore, the apparatuses generally include a gas-liquid separation device and a dehumidifier.

A conventional hydrogen/oxygen-producing apparatus 81 will be described below with reference to a schematic diagram of FIG. 9. The conventional hydrogen/oxygen-producing apparatus 81 includes a pure water-producing device 1 that produces pure-water, which serves as a material for gaseous hydrogen or oxygen; pure water tanks 2a and 2b at the hydrogen-production side and the oxygen-production side, respectively, for storing pure water; an electrolysis cell 3 that produces gaseous hydrogen and oxygen through electrolysis of the pure water; gas-liquid separation devices 4a and 4b at the hydrogen-production side and the oxygen-production side, respectively, that separate the gaseous hydrogen and oxygen, respectively, from the pure water, which is a liquid; dehumidifiers 5a and 5b at the hydrogen-production side and oxygen-production side, respectively, that remove water droplets and water vapor, which is a gas, from the gaseous hydrogen or oxygen; and storage tanks 6a and 6b at the hydrogen side and the oxygen side, respectively, for storing the gaseous hydrogen and oxygen, respectively, from which water and water vapor have been removed.

Figure 9:
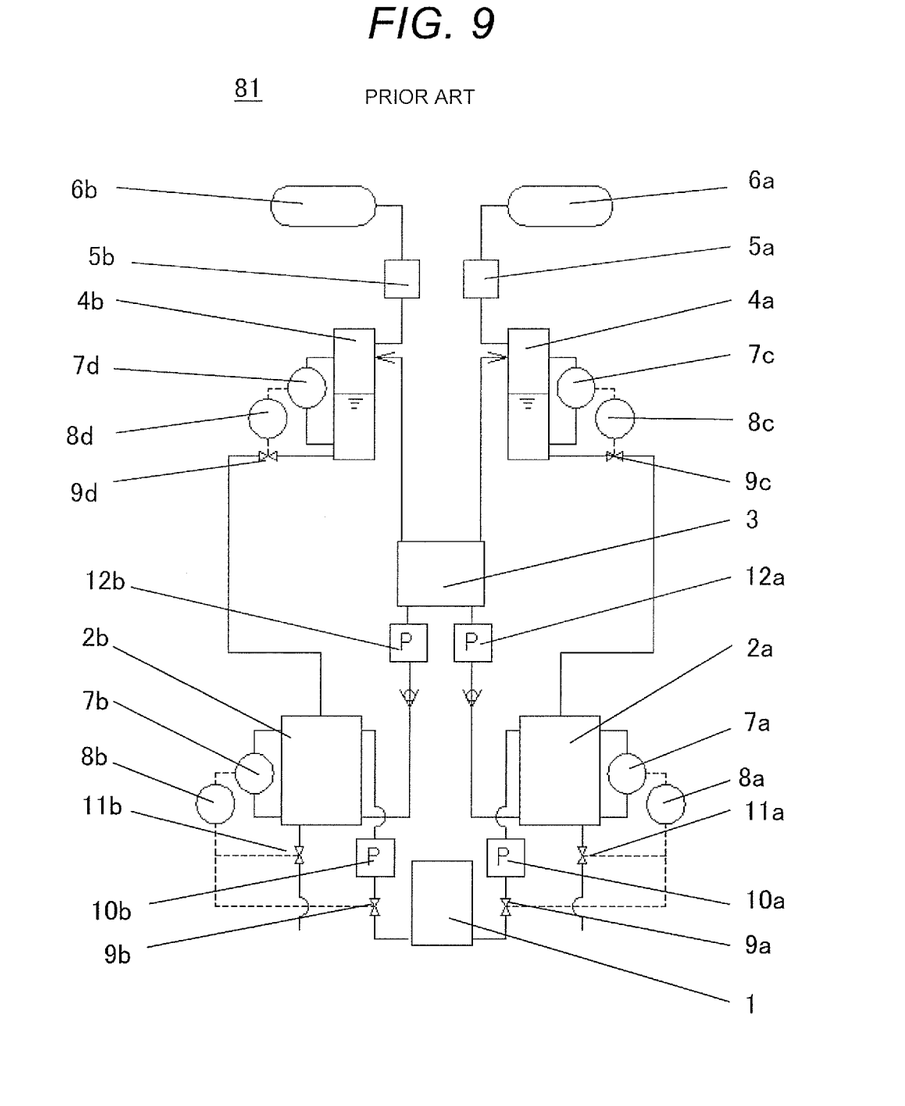
FIG. 9 shows a schematic diagram of a conventional hydrogen/oxygen-producing apparatus.

In the conventional hydrogen/oxygen-producing apparatus 81 of FIG. 9, before hydrogen and oxygen are produced, a preparation in which flow channels present at the hydrogen-production side and the oxygen-production side are filled with pure water in a flowing state (a flowing state refers to a state in which water circulates) is required.

That is, at the hydrogen-production side, the hydrogen-production-side flow channel of the electrolysis cell 3 and the lower part of the gas-liquid separation device 4a at the hydrogen-production side are filled with pure water from the hydrogen-production-side pure water tank 2a by a pump 12a. In the same manner, at the oxygen-production side, the oxygen-production-side flow channel of the electrolysis cell 3 and the lower part of the gas-liquid separation device 4b at the oxygen-production side are filled with pure water from the oxygen-production-side pure water tank 2b by a pump 12b.

In addition, water levels of the pure water tanks 2a and 2b are maintained between upper and lower limits by means of supply pumps 10a and 10b and valves 9a and 9b or drain valves 11a and 11b, respectively, that are controlled by water level sensors 7a and 7b and controllers 8a and 8b.

In the same manner, water levels of the gas-liquid separation devices 4a and 4b are also maintained between upper and lower limits by means of valves 9c and 9d that are controlled by water level sensors 7c and 7d and controllers 8c and 8d.

When, in this manner, the hydrogen-production-side and oxygen-production-side flow channels of the electrolysis cell 3 are filled with pure water in a flowing state, and then, a direct-current voltage is applied between positive and negative electrodes of the electrolysis cell 3 by means of a power-supply device (not shown in the figure), hydrogen produces from the negative-electrode-side flow channel, while oxygen produces from the positive-electrode-side flow channel, and the produced hydrogen and oxygen penetrate into the gas-liquid separation devices 4a and 4b, respectively, together with pure water. Liquid portions of pure water accumulate in lower parts of the gas-liquid separation devices 4a and 4b, and gaseous portions such as hydrogen and oxygen permeate the upper part of the devices. Then, when the hydrogen and the oxygen pass through the dehumidifiers 5a and 5b at the hydrogen-production side and the oxygen-production side, respectively, water and gaseous water vapor are removed from them, and the hydrogen and the oxygen are stored in the storage tanks 6a and 6b at the hydrogen-production side and the oxygen-production side, respectively. However, there is the following problem in the above-described conventional hydrogen/oxygen-producing apparatus 81.

In the above-described conventional hydrogen/oxygen-producing apparatus 81, as amounts of water that are removed from the hydrogen and the oxygen by means of the humidifiers 5a and 5b approach an upper limit of dehumidification by the dehumidifiers 5a and 5b, dehumidifying performance of the dehumidifiers 5a and 5b will be deteriorated.

Therefore, a restoration in which water is released from the dehumidifiers 5a and 5b to the outside is required. For the restoration, for example, it is required that, when the dehumidifying performance is deteriorated, applying a voltage to the electrolysis cell 3 is discontinued, and the dehumidifiers 5a and 5b are replaced with other unused dehumidifiers.

Alternatively, for example, a structure that can realize the following operation would be required. That is, multiple dehumidifiers 5a and 5b are respectively connected with each other, and, by action of valves, they are each brought into a state in which only one of them is used, and they are each brought into another state in which one of the other unused dehumidifiers is used when the amount of removed water approaches the upper limit of dehumidification.

Thus, in order to maintain dehumidifying performance of the dehumidifiers 5a and 5b, such large-scale equipment is required. Alternatively, a discontinuation period for exchanging devices is required upon the operation. As a result, there is a limit to improving the operational rate of the apparatus.

Figure 10:
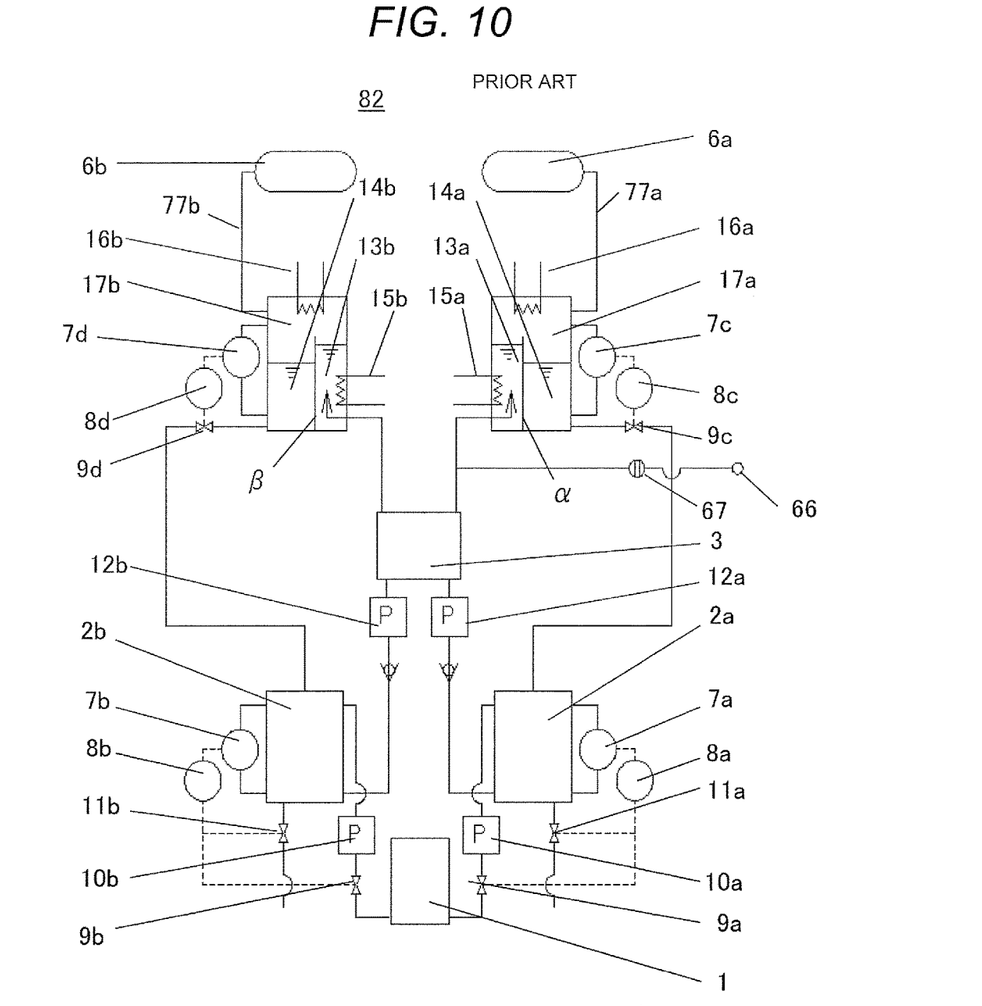
FIG. 10 shows a schematic diagram of the hydrogen/oxygen-producing apparatus described in Japanese Patent No. 333555.

Hence, in order to make it unnecessary to utilize the dehumidifiers 5a and 5b, a hydrogen/oxygen-producing apparatus 82 in which, by arranging gas-liquid separation devices 4a and 4b as cooling types, gases and liquids are separated from each other inside the gas-liquid separation devices 4a and 4b, and a dew point of water vapor is lowered has been proposed (see Japanese Patent No. 333555).

The hydrogen/oxygen-producing apparatus 82 of Japanese Patent No. 333555 will be described based on the schematic diagram of FIG. 10. Matters not mentioned herein are the same as FIG. 9.

With regard to the hydrogen/oxygen-producing apparatus 82 of FIG. 10, its configuration downs treats of the electrolysis cell 3 (an upper part of the figure) differs from the hydrogen/oxygen-producing apparatus 81 of FIG. 9. That is, the differences relate to structures of the gas-liquid separation devices 17a and 17b, and a feature that dehumidifiers 5a and 5b as found in FIG. 9 are not provided downstream of the gas-liquid separation devices 17a and 17b, and the gas-liquid separation devices 17a and 17b are connected directly to storage tanks 6a and 6b.

Hydrogen and oxygen produced in the electrolysis cell 3 are delivered into pure water that has permeated first chamber 13a and 13b of the gas-liquid separation devices 17a and 17b, and move upward inside the pure water, and, consequently, gases are separated therefrom. Since the pure water is maintained at a low temperature by means of cooling devices 15a and 15b, a dew point of water vapor inside the hydrogen and oxygen is lowered while the hydrogen and oxygen move upward inside the pure water. Furthermore, cooling devices 16a and 16b are provided in spaces above the first chambers 13a and 13b, respectively. The hydrogen and oxygen that pass therethrough are cooled by the cooling devices 16a and 16b. Accordingly, the dew point of water vapor decreases. The hydrogen and the oxygen in such a state are stored in storage tanks 6a and 6b. In addition, when the water levels of the first chambers 13a and 13b are full, the pure water moves across partition walls α and β, enters second chambers 14a and 14b, and is further delivered back to the pure water tanks 2a and 2b. According to the hydrogen/oxygen-producing apparatus 82 of Japanese Patent No. 333555, it is not required that dehumidifiers 5a and 5b for decreasing a dew point of water vapor contained in the hydrogen and oxygen be provided therein, problems of an increase in size and complexity of the equipment can be overcome, and it is not required that any discontinuation period for exchanging devices upon the operation be set.

SUMMARY

However, in cases where hydrogen and oxygen produced in the above-described hydrogen/oxygen producing apparatus 82 in Japanese Patent No. 333555 is supplied to fuel cells to cause power production, the following problems will arise:

(1) In FIG. 10, immediately after supply of electric power to the hydrogen/oxygen producing apparatus 82 is started, the air is still present inside the apparatus system such as pipes 77a and 77b, gas-liquid separation devices 17a and 17b and storage tanks 6a and 6b, and therefore, concentrations of hydrogen and oxygen that are stored in the storage tanks 6a and 6b are reduced.

(2) In hydrogen-production-side flow channels of FIG. 10, it has been known that, when hydrogen mixed with the air, serving as a fuel gas for a fuel cell, is supplied to the negative electrode as described above, a partial battery is formed inside the negative electrode, and an electric potential at the positive-electrode side extraordinarily elevates, resulting in rapid deterioration of catalysts.

In order to prevent the hydrogen gas from mixing with the air, for example, as shown in FIG. 10, it is required that hydrogen-production-side flow channels of the hydrogen/oxygen-producing apparatus 82 be subjected to purging with an inert gas such as nitrogen supplied from a supply source 66 by opening a hand valve 67 before applying the electric power. That is, it is required that the air remaining in the gas-liquid separation device 17a, the pipe 77a and the storage tank 6a be removed with an inert gas such as nitrogen. However, for this purpose, a highly concentrated nitrogen gas and equipment for purging with the nitrogen gas are required. Furthermore, even if the air in the hydrogen-production-side flow channels can be purged with a nitrogen gas, the hydrogen concentration will be decreased due to the nitrogen used for purging when the hydrogen produced in an early phase of the water electrolysis reaction is stored and is supplied to a fuel cell. Consequently, the output of the fuel cell will decrease as compared with cases where pure hydrogen is used as a fuel gas.

(3) Also in oxygen-production-side flow channels of FIG. 10, the oxygen concentration will be decreased due to the air that remains in the gas-liquid separation device 17b, the pipe 77b and the storage tank 6b. As a result, the output of the fuel cell will decrease when the oxygen from this apparatus is used therein, as compared with cases where pure oxygen is used as an oxidant gas.

Accordingly, a hydrogen/oxygen-producing apparatus and a hydrogen/oxygen-producing method are provided that can supply highly concentrated hydrogen and oxygen including a certain amount of water vapor but not including a gas other than hydrogen and oxygen, from immediately after initiation of the water electrolysis reaction to termination of the reaction.

A gas-producing apparatus that produces hydrogen or oxygen, includes: an electrolysis cell that produces hydrogen and oxygen through electrolysis of water; and a gas-liquid separation device that is connected to the electrolysis cell and that receives the water and the hydrogen or the oxygen, wherein the gas-liquid separation device includes a first chamber and a second chamber, the first chamber and the second chamber are separated by a partition wall, and a lower part of the first chamber and a lower part of the second chamber are communicated with one another.

A gas-producing method, includes: in a gas-liquid separation device including a first chamber and a second chamber that are separated by a partition wall, filling lower parts of the first chamber and the second chamber, and a storage tank that stores hydrogen or oxygen, with water, to trap the air inside an upper part of the second chamber; receiving, in the first chamber, water including hydrogen or oxygen from an electrolysis cell to collect the hydrogen or the oxygen in an upper part of the first chamber and in an upper part of the storage tank; and filling the storage tank with the hydrogen or the oxygen.

Accordingly, hydrogen and oxygen produced from the electrolysis cell are collected in the upper parts of the first chambers and in the upper parts of the storage tanks for hydrogen and oxygen connected to the first chambers, and volumes of pure water equivalent to volumes of the collected gases move to second chambers of the gas-liquid separation devices, thereby compressing the air preliminarily remaining in the second chambers. Consequently, pressures of the hydrogen and the oxygen in the upper parts of first chambers and storage tanks can be increased. Accordingly, pure hydrogen and pure oxygen not containing gases other than water vapor can be stored at a pressure equal to or higher than the atmospheric pressure from an early phase of the water electrolysis reaction. Furthermore, since a dew point of water vapor contained in the pure hydrogen and the pure oxygen stored in this manner is equal to a temperature of the pure water that passes through the electrolysis cell, it is not required that the hydrogen and the oxygen are once again humidified and then used inside the fuel cell system, as long as the temperature of the pure water is appropriately adjusted.

DESCRIPTION OF EMBODIMENTS

Hereinafter, various exemplary embodiments will be described with reference to the drawings.

First Embodiment

Figure 1:
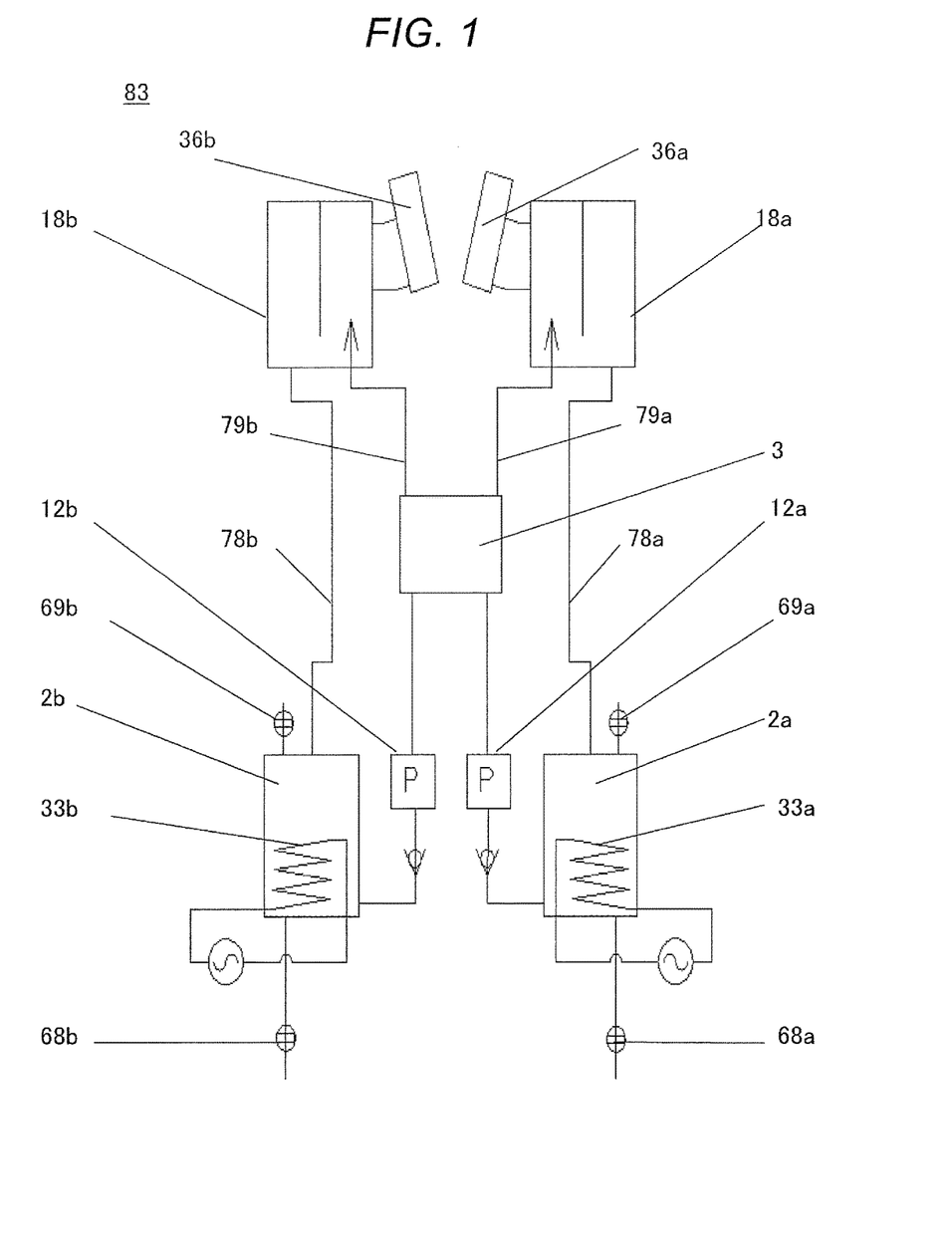
FIG. 1 shows a schematic diagram of a hydrogen/oxygen-producing apparatus according to a first embodiment.

FIG. 1 is a schematic diagram of a hydrogen/oxygen-producing apparatus 83 according to the first embodiment.
<General Configuration>

In FIG. 1, a configuration downstream of the electrolysis cell 3 (the upper part of the figure) of the hydrogen/oxygen-producing apparatus 83 in the first embodiment is different from that of the hydrogen/oxygen-producing apparatus 82 of Japanese Patent No. 333555. Furthermore, one difference is that the pure water-producing device 1 and supply pumps 10a and 10b as found in FIG. 10 are not connected to the pure water tanks 2a and 2b. Additionally, those not described herein are the same as FIGS. 9 and 10.

That is, the hydrogen/oxygen-producing apparatus 83 of the first embodiment mainly includes pure tanks 2a and 2b, an electrolysis cell 3, and gas-liquid separation device 18a and 18b.

In addition, storage tanks 36a and 36b are integrated with the gas-liquid separation devices 18a and 18b. Furthermore, the hydrogen/oxygen-producing apparatus 83 is configured to produce ether of hydrogen or oxygen. In other words, the hydrogen/oxygen-producing apparatus 83 may be an apparatus that includes the electrolysis cell 3 and only the right-side or left-side structure in FIG. 1.
<Whole Process>

In FIG. 1, pure water injected from the storage tanks 36a and 36b passes through the gas-liquid separation devices 18a and 18b, and pipes 78a and 78b, reaches pure water tanks 2a and 2b, and passes through the electrolysis cell 3 and further through pipes 79a and 79b, and is returned to the gas-liquid separation devices 18a and 18b by action of pumps 12a and 12b.

That is, the pure water circulates through the electrolysis cell 3, the gas-liquid separation devices 18a and 18b, and the pure water tanks 2a and 2b. When, in a state where the pure water circulates in such a way, a direct-current voltage is applied to positive and negative electrodes of the electrolysis cell 3 by means of a power-supply device (not shown in the figure), oxygen and hydrogen are produced from the positive and negative electrodes, respectively, of the electrolysis cell 3. The oxygen and the hydrogen pass through the pipes 79a and 79b, respectively, in the stream of the pure water while being contained in the pure water, and are delivered to the gas-liquid separation devices 18a and 18b, respectively.
<Gas-Liquid Separation Devices 18a and 18b>

Figure 2:
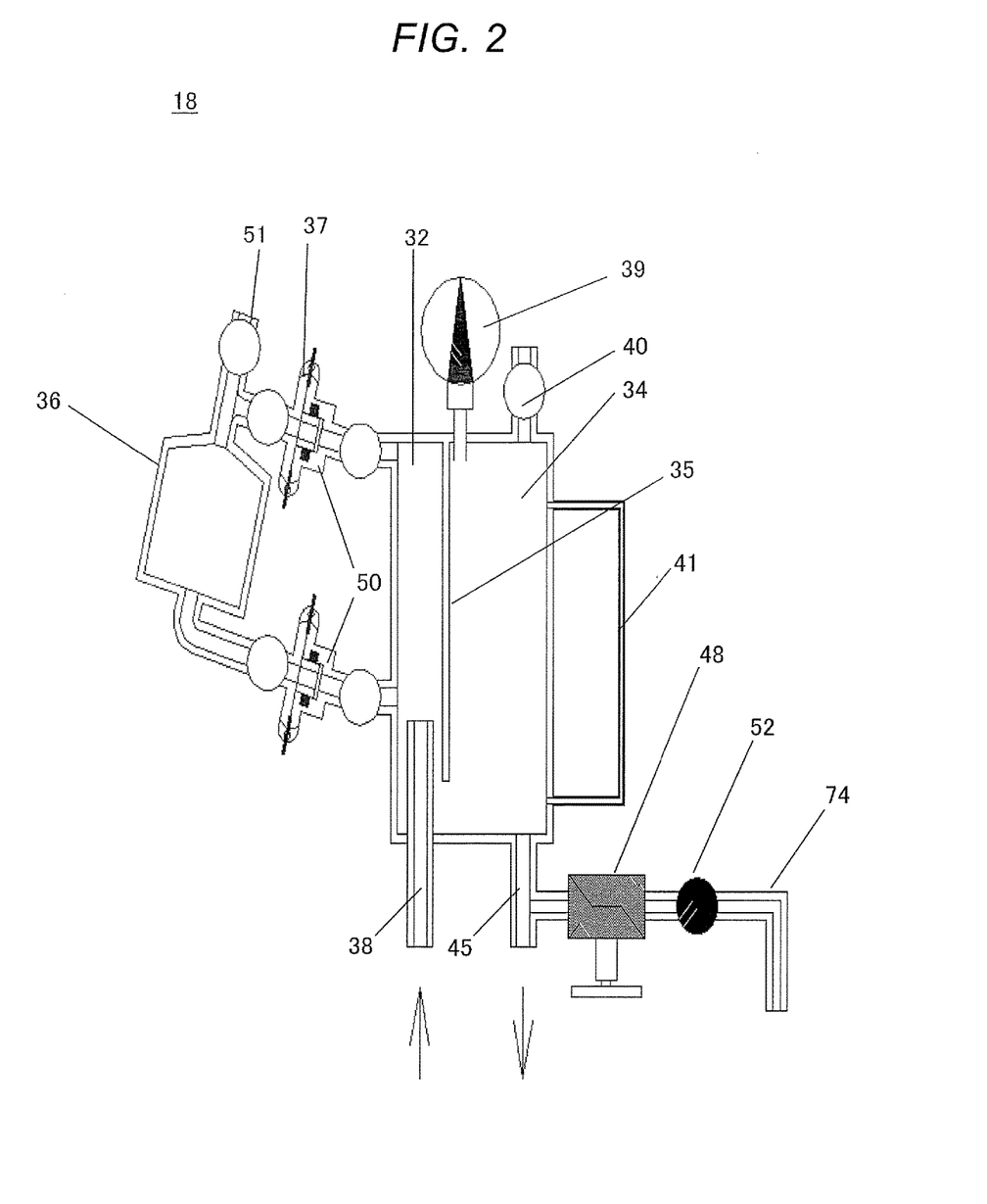
FIG. 2 shows a detailed diagram of a gas-liquid separation device inside the hydrogen/oxygen-producing apparatus according to the first embodiment.

FIG. 2 is a detailed cross-sectional diagram of the gas-liquid separation device 18 (18a and 18b) in the hydrogen/oxygen-producing apparatus 83 according to the first embodiment in FIG. 1. In the gas-liquid separation device 18, upper parts of a first chamber 32 and a second chamber 34 are separated by a partition wall 35. However, lower parts of the first chamber 32 and the second chamber 34 communicate with one another. A storage tank 36 is connected to the first chamber 32 in the gas/liquid separation device 18 via connecting clasps in two parts, i.e., the upper connecting part and the lower connecting part. O-rings are provided in the connecting parts, thereby preventing the hydrogen, oxygen and pure water from leaking to the outside. An inlet pipe 38, into which the pure water containing hydrogen or oxygen flows from the electrolysis cell 3, is provided in a lower part of the first chamber 32, and the upper edge of the inlet pipe 38 is located vertically above the lower edge of the partition wall 35 that separates the first chamber 32 and the second chamber 34. A pressure gauge 39 and a hand valve 40 are attached on the upper part of the second chamber 34, a water level pipe 41 for visual inspection of the water level is attached on the side surface of the second chamber 34, and an outlet pipe 45 including a branch pipe 74 in which a needle valve 48 and a hand valve 52 are serially provided is attached on the lower part of the second chamber 34. The inlet pipe 38 of the first chamber 32 is connected to the hydrogen-production-side or oxygen-production-side outlet of the electrolysis cell 3 in FIG. 1, and the outlet pipe 45 of the second chamber 34 is connected to the pipe from the upper part of the pure water tank 2a or 2b in FIG. 1.
<Process>

FIGS. 3A to 3G are state-transition diagrams indicating initiation of the reaction preparation of the gas-liquid separation device 18 (18a and 18b) used in the hydrogen/oxygen-producing apparatus 83 according to the first embodiment in FIG. 1, replacement of the storage tank 36 for storage of hydrogen or oxygen when it is full, and a state capable of again initiating the reaction.

(1) Initiation of the Preparation Before the Water Electrolysis Reaction in the Electrolysis Cell 3

Figure 3A:
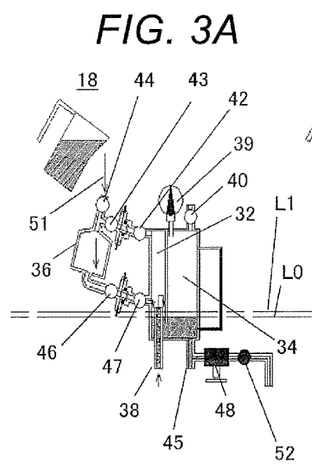
FIGS. 3A to 3G show state-transition diagrams of the gas-liquid separation device inside the hydrogen/oxygen-producing apparatus according to the first embodiment.

FIG. 3A will be described below. In FIG. 3A, it is assumed that hand valves 40, 42, 43, 44, 46 and 47 are opened, and a needle valve 48 and a hand valve 52 are closed. In this state, pure water is injected into the inlet 51 of the storage tank 36. In the figures, "∘" indicates that the hand valve is opened, while "•" indicates that the hand valve is closed. The injected pure water flows from the first chamber 32, which is a gas-liquid separation part, to the second chamber 34, and flows into the pure water tank 2a or 2b in FIG. 1 from the outlet pipe 45 of the second chamber 34. In a state where the hand valve 69a or 69b in the pure water tank 2a or 2b in FIG. 1 is opened, the injection is continued, and, when the level out reaches the hand valve 69a or 69b, the valve is closed.

Next, when, the pumps 12a and 12b in FIG. 1 are activated, the pure water flows from the pure water tank 2a and 2b into the hydrogen and oxygen flow channels of the electrolysis cell 3 by action of pumps 12a and 12b, and thus, the respective flow channels of the electrolysis cell 3 and manifolds are filled with the pure water. Then, the pure water enters the gas-liquid separation devices 18 (18a and 18b) from the electrolysis cell 3 through the inlet pipe 38 in FIG. 3A, and eventually overflows from the upper edge of the inlet pipe 38.

When the common water surfaces in the first chamber 32 and the second chamber 34 reach a line L0, the hand valve 40 is closed, and the injection manipulation in FIG. 3A is continued.

Figure 3B:
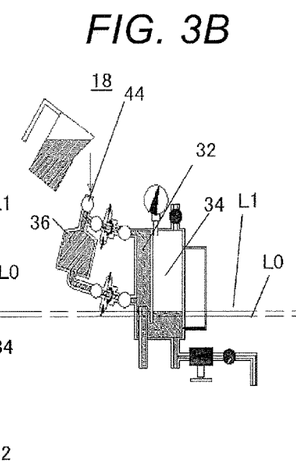

FIG. 3B will be described below. As shown in FIG. 3B, when, upon continuation of the above-described injection manipulation, the pure water outreaches the hand valve 44, and overflows, the injection manipulation is discontinued, and the hand valve 44 is closed. At that time, the water surface in the second chamber 34 rises from the line L0 to the line L1 so as to balance with the head of water accumulated in each of the first chamber 32 and the storage tank 36. By the above manipulation, the air remains in a part of the second chamber 34 above the line L1, and the other region inside the device in which the pure water can circulates, is entirely full of pure water in a flowing state. This state is a condition for initiating the water electrolysis reaction (operation of the electrolysis cell 3).

(2) During the Water Electrolysis Reaction in the Electrolysis Cell 3

Figure 3C:
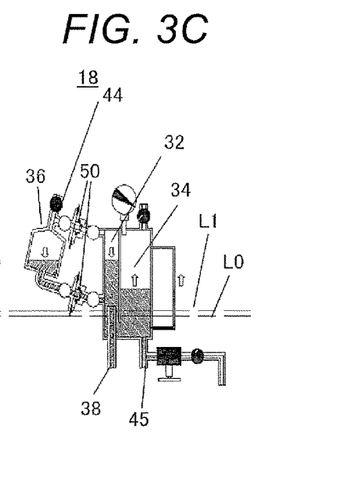

FIG. 3C will be described below. FIG. 3C shows a state of the course in which hydrogen and oxygen produced by the water electrolysis reaction (operation of the electrolysis cell 3) are being collected. That is, when a direct-current voltage is applied between the positive and negative electrodes of the electrolysis cell 3 in FIG. 1 in the above-described state for initiating the water electrolysis reaction, the water electrolysis reaction of pure water occurs inside the electrolysis cell 3, hydrogen and oxygen are produced at the negative-electrode side and the positive-electrode side, respectively. The pure water around each electrode in the electrolysis cell 3 in FIG. 1 contains hydrogen or oxygen produced by the water electrolysis reaction, and is discharged from each outlet. The pure water and hydrogen or oxygen contained in the pure water from the electrolysis cell 3 enter the gas-liquid separation device 18 (18a or 18b) from the inlet pipe 38 (FIG. 2), and, when they reach the upper edge of the inlet pipe 38, gaseous hydrogen or oxygen rises upward due to its buoyance, passes a hollow area inside the connecting part 50 between the first chamber 32 and the storage tank 36, and accumulates in the upper part of the storage tank 36.

In this case, the pure water is mixed with pure water in lower parts of the first chamber 32 and the second chamber 34. By the action of pump 12a or 12b in FIG. 1, the pure water inside the second chamber 34 passes through the outlet pipe 45 of the second chamber 34, proceeds to the pure water tank 2a or 2b in FIG. 1, further passes through the pumps 12a or 12b itself from the pure water tank 2a or 2b, and is again circulated into the electrolysis cell 3 in FIG. 1.

Since then, as the reaction continues, the volume of gaseous phase portion of hydrogen or oxygen accumulated in the upper parts of the storage tank 36 and the first chamber 32 increases, and the surface level of pure water in the first chamber 32 descends. The gaseous phase expands from the upside to the downside of the storage tank 36, and, simultaneously, passes through the connecting part 50, thus expanding also to the first chamber 32. At the same time, a volume of pure water equivalent to the volume of the above gaseous phase portion turns back into the second chamber 34, and the air phase remaining in the upper part of the second chamber 34 is thereby pressed and compressed. In other words, the amounts of collected hydrogen and oxygen increase, and, simultaneously, pressures of hydrogen and oxygen themselves and a pressure of the air phase elevate.

(3) Extraction of Hydrogen and Oxygen

Figure 3D:
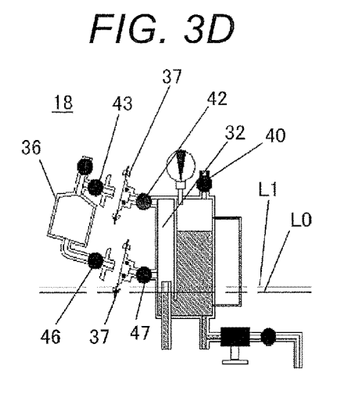

As shown in FIG. 3D, when the reaction further continues, and the water surface below the gaseous phase of hydrogen or oxygen in the first chamber 32 reaches the line L0, applying a direct-current voltage to the electrolysis cell 3 in FIG. 1 is discontinued, and an exchange manipulation of the storage tank 36 described below is started. At first, in a state where hand valves 42, 43, 46 and 47 are closed, a connecting clasp 37 is released, and then, the storage tank 36 that is full of hydrogen or oxygen is detached.

Figure 3E:
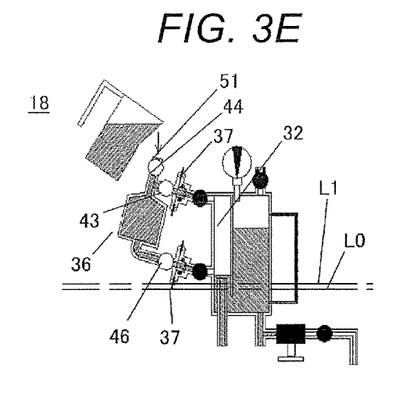

As shown in FIG. 3E, then, an empty storage tank 36 in a state where hand valves 44, 43 and 46 are opened is connected to the first chamber 32, and the connecting clasp 37 is set thereto. Furthermore, pure water is injected thereto from the inlet 51, and, when the water surface slightly outreaches the hand valve 44, the hand valve 44 is closed.

(4) Again Initiating the State that Enables the Water Hydrolysis Reaction

Figure 3F:
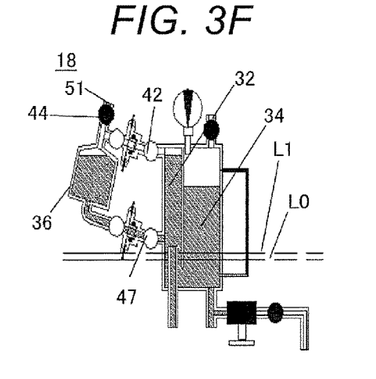

As shown in FIG. 3F, when the hand valves 42 and 47 are opened from this state, the gaseous phase in the upper part of the first chamber 32 and the pure water in the lower part of the storage tank 36 switch places with one another, and the water surfaces in the first chamber 32 and the storage tank 36 are now at the same level. These water surfaces are not always at the same level with the water surface of the pure water inside the second chamber 34. Over the above series of operations, the pressure of hydrogen or oxygen remaining in the upper part of the storage tank 36 and in the upper part of the first chamber 32 is equal to the pressure of the air in the second chamber 34, and is maintained at a higher level than the atmospheric pressure.

Figure 3G:
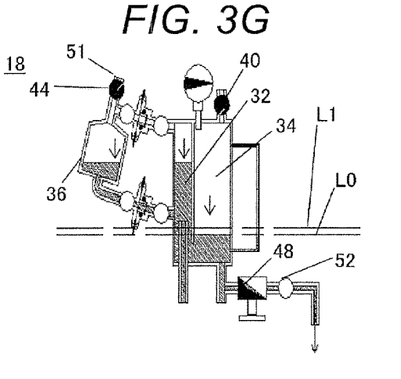

As shown in FIG. 3G, then, when the hand valve 52 is opened in a state where the flow rate is limited by the needle valve 48, the pure water is discharged to the outside by the hydrogen or oxygen that remains in the upper part of the storage tank 36 or in the upper part of the first chamber 32 and that is maintained at a high pressure, and by the high-pressure air in the second chamber 34, and, when the surface of the pure water in the second chamber 34 reaches the line L0, the hand valve 52 is closed to terminate discharge of the water.

This state is a reaction-initiating condition after the storage tank 36 is replaced with a second or subsequent storage tank. When the above-described manipulations are repeated from this state, hydrogen or oxygen can continuously be collected in the storage tanks 36. Additionally, pure water that is consumed by the electrolysis reaction is compensated with a difference between the volume of pure water in FIG. 3E above and the volume of discharged water in FIG. 3G above.

(5) Termination of Operation

At the termination of operation of the hydrogen/oxygen-producing apparatus, applying a direct-current voltage to the electrolysis cell 3 in FIG. 1 is discontinued, in the state of FIG. 3F, an exhaust hose (not shown in the figures) that communicates with an exhaust-exclusive pipe (not shown in the figures), the pressure inside of which is maintained at the atmospheric pressure or lower, is connected to the inlet 51 of the storage tank 36, and the hand valve 44 is opened. By this manipulation, high-pressure hydrogen or oxygen remaining in the upper parts of storage tank 36 and the first chamber 32 of the gas-liquid separation device 18 passes through the exhaust hose, and reaches the exhaust-exclusive pipe. In this manner, after the remaining hydrogen and oxygen are sufficiently discharged, the storage tank 36 and the above exhaust hose are removed, the hand valve 40 in the second chamber is opened, and the hand valves 68a and 68b in FIG. 1 are opened, thereby discharging all the pure water in the region where the pure water can circulate from the lower parts of the pure water tanks 2a and 2b. When production of hydrogen and oxygen is restarted, manipulations are started from the manipulation in FIG. 3A.

<Evaluation>

Figure 4:
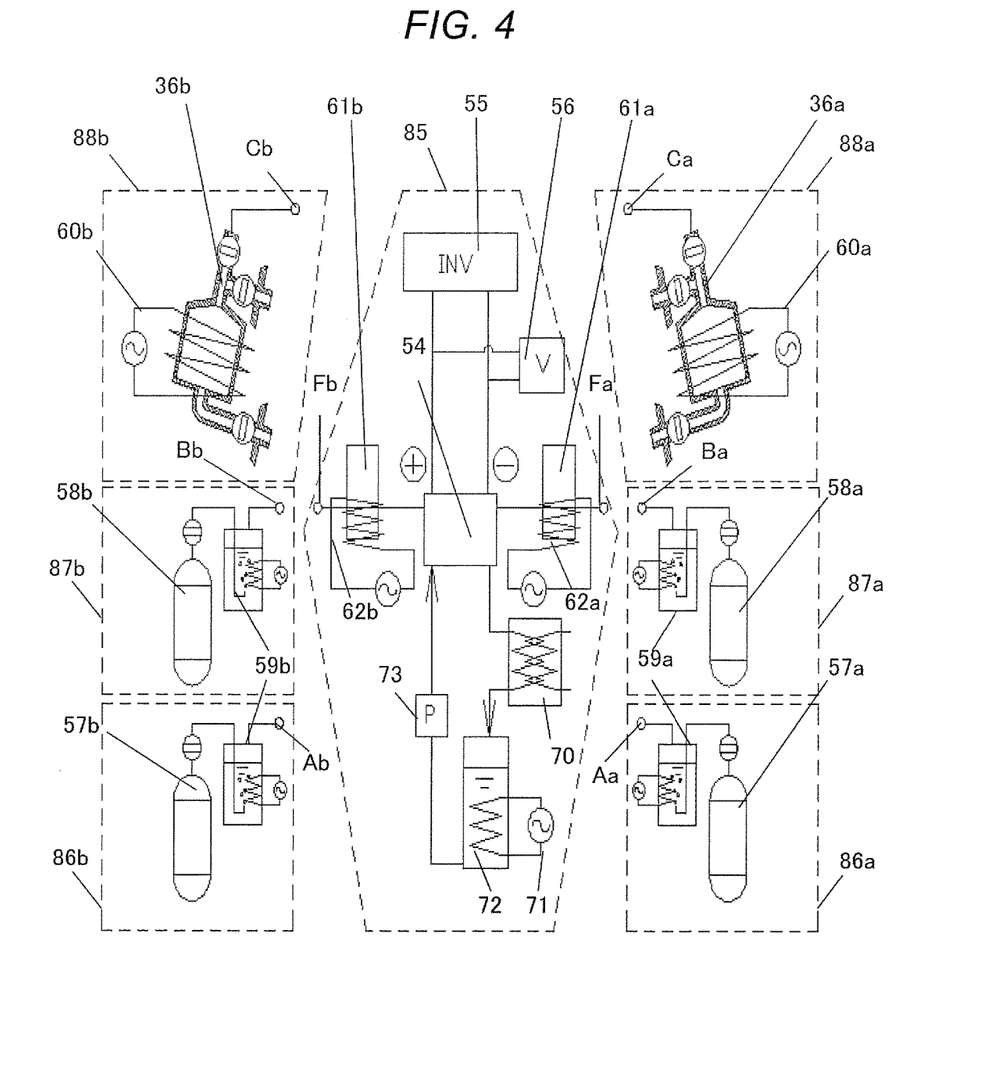
FIG. 4 shows a schematic diagram of an apparatus for evaluating a fuel cell stack.

FIG. 4 is a schematic diagram of an apparatus for evaluating a fuel cell stack. With this evaluation apparatus, the above-described hydrogen/oxygen-producing apparatus according to the first embodiment is evaluated.

Gases according to the following three patterns were supplied to the fuel cell stack, and power production was carried out. That is, the gases according to the three patterns were respectively supplied to the same fuel cell stack to elucidate differences in the performance.

Gas A (comparative example): hydrogen containing 25% carbon dioxide, serving as a negative electrode gas, and oxygen containing 80% nitrogen, serving as a positive electrode gas, are supplied thereto.

Gas B (comparative example): pure hydrogen serving as a negative electrode gas, and pure oxygen serving as a positive electrode gas are supplied thereto.

Gas C (example): hydrogen produced by the hydrogen/oxygen-producing apparatus according to the first embodiment, serving as a negative electrode gas, and oxygen produced by the hydrogen/oxygen-producing apparatus according to the first embodiment, serving as a positive electrode gas, are supplied thereto.

In addition, with regard to the gas C, hydrogen and oxygen produced in a state of an early phase of the water electrolysis reaction were collected in the storage tanks 36, and were used. During the water electrolysis reaction, heaters 33a and 33b of the pure water tanks 2a and 2b in FIG. 1 were set to 80° C. The reason why the temperatures were set to 80° C. is because 80° C. is a temperature where the efficiency is maximum due to the properties of electrolysis cell.

<Configuration of the Evaluation Apparatus>

FIG. 4 includes: an evaluation apparatus 85 for evaluating performance of a fuel cell by supplying gases A to C thereto; a supply device 86a that supplies the negative electrode gas of the gas A; a supply device 86b that supplies the positive electrode gas of the gas A; a supply device 87a that supplies the negative electrode gas of the gas B; a supply device 87b that supplies the positive electrode gas of the gas B; a supply device 88a that supplies the negative gas of the gas C; and a supply device 88b that supplies the positive gas of the gas C.

The evaluation apparatus 85 includes: a fuel cell stack 54; an inverter 55 that extracts currents from the fuel cell stack 54; a voltmeter 56 that measures a voltage during extraction of currents; a cooling water tanks 72 and a cooling water pump 73 for collecting heats produced from the fuel cell stack 54 and for maintaining the fuel cell stack 54 at constant temperature; mass flow controllers 61a and 61b that supply certain volumes of negative and positive electrode gases to the fuel cell stack 54.

The supply device 86a for the negative electrode gas of the gas A and the supply device 86b for the positive electrode gas of the gas A include, respectively, storage tanks 57a and 57b in which the respective gases are encapsulated, and heating-bubbling-type humidifiers 59a and 59b that humidify the respective gases.

The supply device 87a for the negative electrode gas of the gas B and the supply device 87b for the positive electrode gas of the gas B include, respectively, storage tanks 58a and 58b in which the respective gases are encapsulated, and heating-bubbling-type humidifiers 59a and 59b that humidify the respective gases.

The supply device 88a for the negative electrode gas of the gas C and the supply device 88b for the positive electrode gas of the gas C are devices according to the first embodiment, and include, respectively, storage tanks 36a and 36b in which the respective gases are encapsulated, and heaters 60a and 60b, which are parts of the device according to the first embodiment.

<Process for the Evaluation Apparatus>

In order to introduce the gases A to C into the evaluation apparatus 85, connecting ports Aa, Ba and Ca were each connected to a connecting port Fa, and connecting ports Ab, Bb and Cb were each connected to a connecting port Fb, thereby supplying the negative and positive electrode gases to the fuel cell stack 54.

When the gases A and B among the above gases were supplied to the evaluation apparatus 85, the heating-bubbling-type humidifiers 59a and 59b were heated to 65° C., and then, humidification was carried out therein. Additionally, when the gas C was supplied to the evaluation apparatus 85, the heaters 60a and 60b were heated to 65° C.

Furthermore, mass flow controllers 61a and 61b were heated to 90° C. by the heaters 62a and 62b. The reason why the mass flow controllers are thus heated is because malfunctions due to dew condensation inside the mass flow controllers 61a and 61b are prevented by heating them to a temperature higher than dew points of the supplied gases.

When the gases A to C are supplied in the above-described state, the fuel cell stack 54 reaches an open circuit state (called OCV), and then, electric currents are collected by the inverter 55. In that case, electric currents are stepwise increased until they reach a required current value. In this case, due to characteristics of the fuel cell stack 54, the voltage declines as the extracted currents increase (called I-V characteristics). When a final current value is reached, and the voltage value becomes stable over time, the stable voltage value serves as an index for evaluating performance of the fuel cell stack. Furthermore, in order to stabilize the voltage of the fuel cell stack 54 during power production, it is required that the temperature of cooling water that flows through a cooling water path inside the fuel cell stack 54 be stabilized. Therefore, a set temperature of a heat exchanger 70 and a set value for a flow rate of the cooling water pump 73 in FIG. 4 were adjusted such that the cooling water flowing into the fuel cell stack 54 showed an inlet temperature of 60° C. and an outlet temperature of 70° C.

<Results>

Figure 5A:
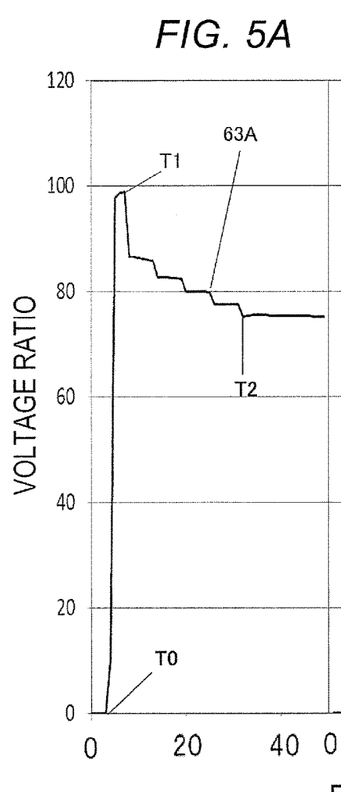
FIGS. 5A to 5C show graphs indicating time-dependent changes from initiation of the gas supply to a steady state of the voltage ratio in cases where gases A, B and C are respectively supplied to the apparatus for evaluating a fuel cell.
Figure 5B:
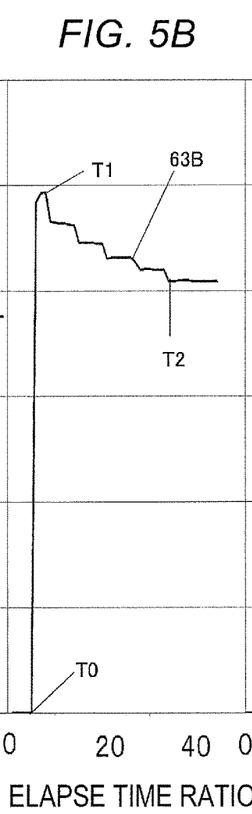
Figure 5C:
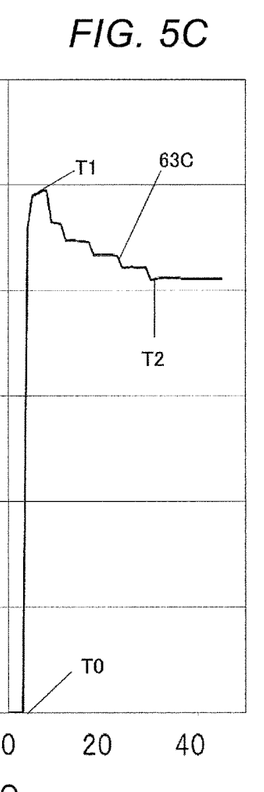

Results are shown in FIGS. 5A to 5C. Curves obtained by plotting, on the vertical axes and the horizontal axes, voltage ratios and elapse time ratios produced by the fuel cell stack 54 of FIG. 4 when the gases A to C are each supplied to the fuel cell stack 54 to thereby carry out power production are shown as curves 63A, 63B and 63C. With regard to both voltages and time, the ratios are calculated with respect to standards.

In each curve, an elapse time ratio T0 corresponds to a gas-circulation-starting point, and an elapse time ratio T1 corresponds to an open-circuit voltage (called OCV). The amount of currents extracted by the inverter 55 in FIG. 4 is stepwise increased from the point of elapse time ratio T1, reaching a stable current at the elapse time ratio T2. For this reason, the voltage ratios are stepwise decreased from the elapse time ratio T1 to the elapse time ratio T2. The stable voltage ratio after the elapse time ratio T2 represents an output ratio of the fuel cell stack 54.

The stable voltage ratio of the curve 63A is about 75, while the stable voltage ratio of the curve 63B is about 81. This is because, while, as to the gas A, hydrogen containing 25% carbon dioxide is supplied to the negative electrode, and oxygen containing 80% nitrogen is supplied to the positive electrode, as to the gas B, pure hydrogen is supplied to the negative electrode, and pure oxygen is supplied to the positive electrode, and an output-improving effect, which is called a gain voltage, occurs.

On the other hand, the stable voltage ratio of the curve 63C for the gas C is also about 81, and almost agrees to that of the curve 63B. Therefore, it is considered that, as to the gas C, the negative electrode gas and the positive electrode gas were pure hydrogen and pure oxygen, respectively. Thus, it is revealed that, according to the hydrogen/oxygen-producing apparatus of the first embodiment, approximately 100% hydrogen and oxygen can be collected from the early phase of the reaction in the electrolysis cell.

Second Embodiment

Figure 6:
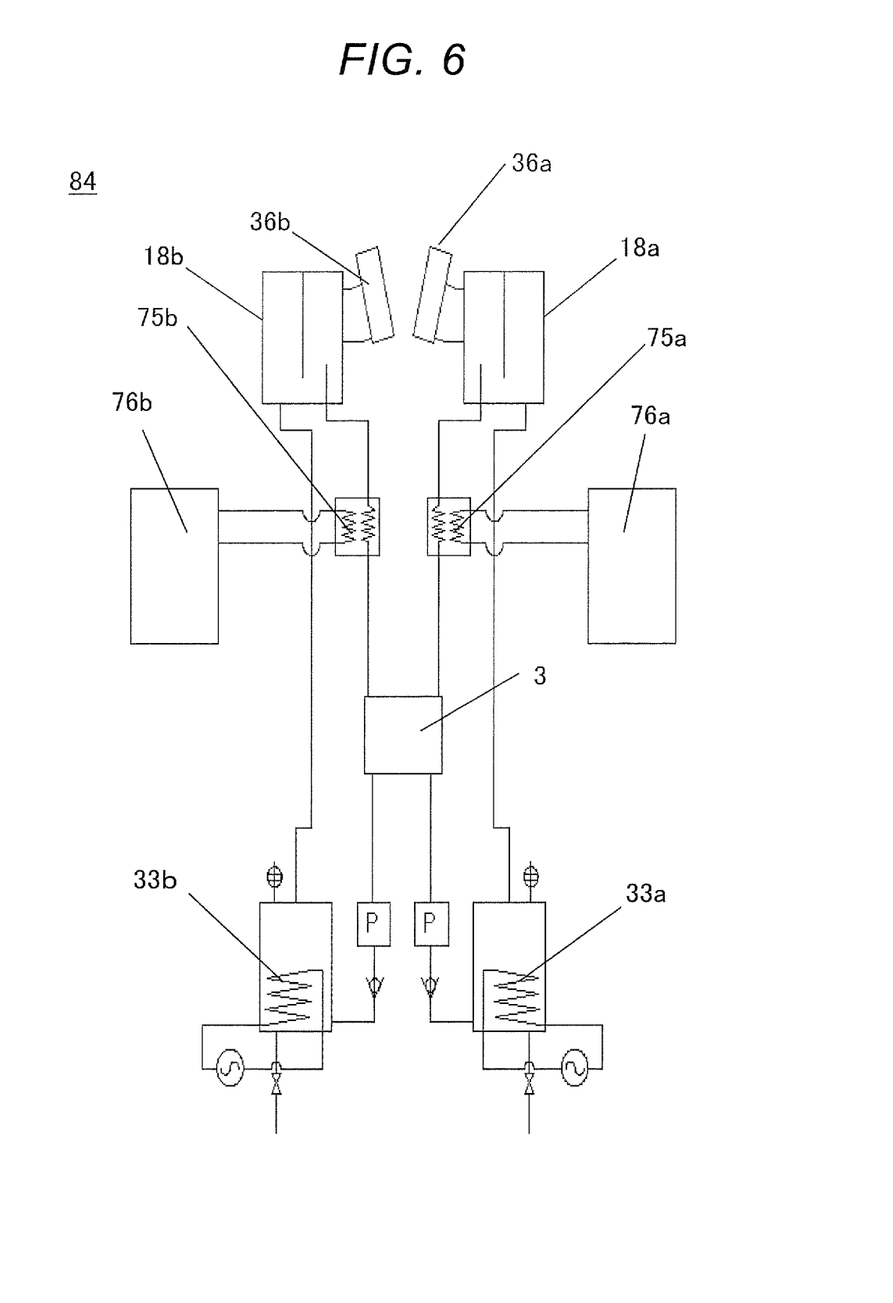
FIG. 6 shows a schematic diagram of a hydrogen/oxygen-producing apparatus according to a second embodiment.

FIG. 6 is a schematic diagram of a hydrogen/oxygen-producing apparatus 84 according to a second embodiment.

<General Configuration>

A difference between the first embodiment shown in FIG. 1 and the second embodiment shown in FIG. 6 is that, in the second embodiment, heat exchangers 75a and 75b are connected to an electrolysis cell 3 between a gas-liquid separation device 18a at the hydrogen-production side and a gas-liquid separation device 18b at the oxygen-production side. Matters not mentioned herein are the same as the first embodiment.

That is, the temperature of pure water containing hydrogen or oxygen produced in the electrolysis cell 3 is lowered with heat exchanger 75a or 75b and a chiller 76a or 76b to also lower the temperature of hydrogen or oxygen itself, and thus, water vapor included in the gas can be condensed, thereby unifying the condensed water vapors with the pure water.

According to this, by adjusting a set temperature of the heat exchangers 75a and 75b, a dew point of water vapor included in hydrogen and oxygen inside storage tanks 36a and 36b can be adjusted to a value that is required for equipment that utilizes hydrogen and oxygen, for example, a dew point of water vapor that optimizes a power production reaction in home fuel cell stacks.

<Process>

In the second embodiment, set temperatures for the heat exchangers 75a and 75b in FIG. 6 were set to 65° C., thereby adjusting the dew point of water vapor such that it was optimal for a power production reaction in a fuel cell stack 54 used at this time. Other matters with regard to the process are the same as the first embodiment, and therefore, are omitted.

<Evaluation>

Figure 7:
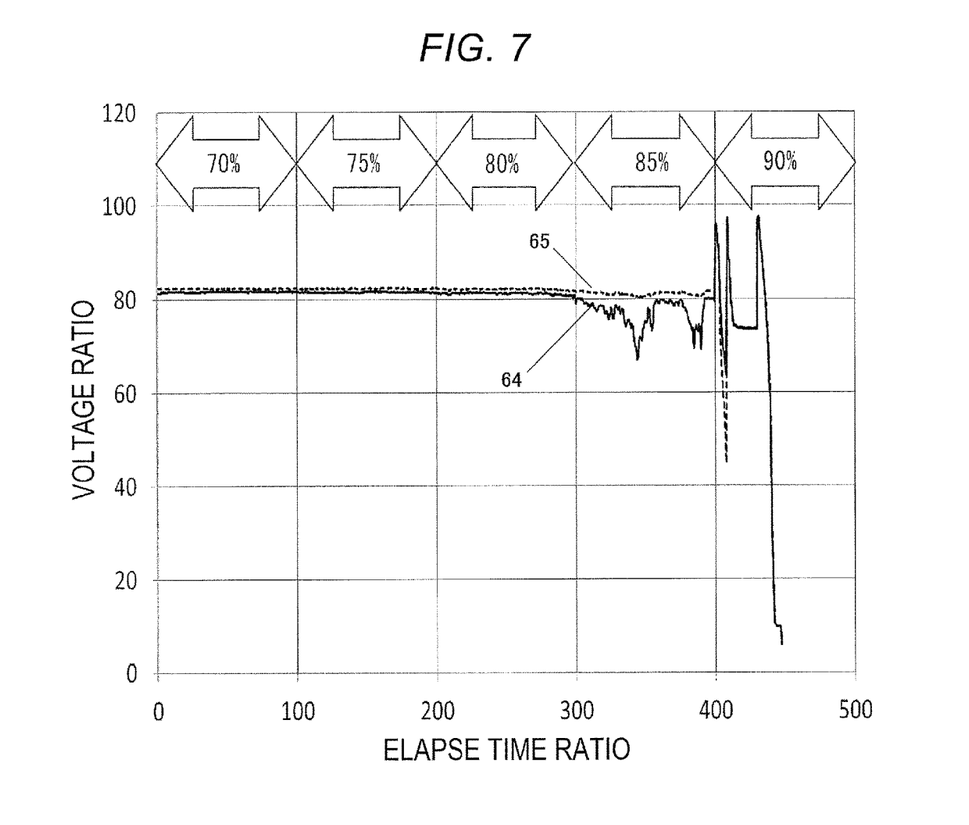
FIG. 7 shows a graph indicating gas utilization rate resistance in case where the gas C in the first embodiment and a gas D in the second embodiment are supplied to the apparatus for evaluating a fuel cell.

FIG. 7 shows results of evaluation made with the evaluation apparatus 85 of FIG. 4 using the gas C produced in the first embodiment and the gas D produced in the second embodiment.

When the gas C was produced in the first embodiment, the heaters 33a and 33b in FIG. 1 were set to 80° C., and, when the gas C was supplied to the fuel cell stack 54, the heaters 60a and 60b in FIG. 4 were set to 85° C. 80° C. is a temperature that can efficiently produce hydrogen and oxygen in the first embodiment, and 85° C. is a temperature for elevating the temperature of the supplied gas from 80° C. by 5° C. in order to prevent condensation of the supplied gas prior to supplying the gas to the fuel cell stack.

When the gas D was produced in the second embodiment, the heaters 33a and 33b in FIG. 6 were set to 80° C., and, heater exchanger 75a and 75b were set to 65° C. 65° C. is a dew point of water vapor that was optimal for power production by the fuel cell stack 54 used this time.

Furthermore, when the gas D was supplied to the fuel cell stack 54 in FIG. 4, the heaters 60a and 60b were set to 85° C. In any of the above cases, as to cooling water for the fuel cell stack 54 in FIG. 4, the amount of cooling water was adjusted such that the inlet temperature indicated 60° C. and the outlet temperature indicated 70° C., and thus, power production was carried out.

In FIG. 7, curves 64 and 65 correspond to a case where the gas C of the first embodiment was used, and a case where the gas D of the second embodiment was used; respectively. In FIG. 7, the horizontal axis refers to an elapse time ratio, and the vertical axis refers to a voltage ratio. Over the time elapsed, the utilization rate of the gas was varied. The utilization rates are indicated in the upper part of FIG. 7.

Here, the utilization rate of gas refers to a ratio of an amount of gas consumed in the fuel cell and an amount of the supplied gas. When the utilization rate is 85%, it means that an amount of gas that is larger than an amount of gas required for power production by 15% is supplied. When the utilization rate is high, if is considered that the supply amount of the gas is small, and therefore, the flow velocity decreases, and flooding resistance is lowered. However, it is considered that the operation is possible even in the state where the utilization rate is high, and therefore, high performance can be realized.

When the amplitude of vibration in the curve 64 in the same utilization of 85% is compared with the amplitude of vibration of the graph of curve 65, it is understood that the amplitude of vibration in the curve 65 is smaller.

It is considered that the reason why the amplitude of vibration in the curve 64 is larger is because the dew point of water vapor of the gas in the first embodiment is 80° C., the relative humidity is 100% or higher in the power production temperature of the fuel cell stack 54 (a mean value of outlet and inlet temperatures of the cooling water is 65° C.), and dew condensation occurs inside flow channels of the fuel cell stack 54, causing flooding, and resulting in partial and temporal gas blockage.

On the other hand, it is considered that the reason why the amplitude of vibration in the curve 65 is small is because the dew point of water vapor in the second embodiment is 65° C. by action of heat exchangers 75a and 75b, the relative humidity is controlled to be approximately 100% in a power production temperature of 65° C. in the fuel cell stack 54, and therefore, the amount of condensed water is smaller than in the gas of the first embodiment, and gas blockage due to flooding hardly occurs.

<Additional Matters>

Additionally, in a hydrogen/oxygen-producing apparatus according to the various embodiments, upper parts of two vessels (a first chamber 32 and a second chamber 34) that form the gas-liquid separation device 18 are separated by the partition wall 35, and the lower parts of the vessels are communicated with one another. This makes it possible to fill the vessel of first chamber 32 with pure water and to supply pure water to the second chamber 34 so as to seal the air inside it.

Therefore, when hydrogen and oxygen produced in the electrolysis cell 3 are collected in the upper part of the vessel of the first chamber 32 that is filled with pure water, the air in the second chamber 34 can be compressed with the corresponding volume of pure water Accordingly, as the water hydrolysis reaction in the electrolysis cell 3 proceeds, the pressure of the collected hydrogen or oxygen increases, and hydrogen or oxygen with an increased pressure is accumulated in an easily-detachable storage tank 36, and the storage tank 36 can be carried to any equipment where the hydrogen or oxygen is used.

Moreover, since the hydrogen and the oxygen produced in the electrolysis cell 3 have the same dew point of water vapor as the temperature of pure water that passes through the electrolysis cell 3, for example, it is not required that the hydrogen and the oxygen be again humidified when they are supplied to a fuel cell stack that requires the supplied hydrogen and oxygen to contain water vapor.

Furthermore, the hydrogen/oxygen-producing apparatus can deal with even a case in which it is required that water vapor in the hydrogen or oxygen be reduced. Therefore, the hydrogen/oxygen-producing apparatus can be optimal as a supplier of hydrogen or oxygen to equipment that uses hydrogen or oxygen.

In addition, besides cases in which both hydrogen and oxygen are produced, an apparatus or method that produces only either one of them is possible. In that case, the mechanism in the part for producing hydrogen or oxygen becomes unnecessary in the above apparatus.

Third Embodiment

Figure 8:
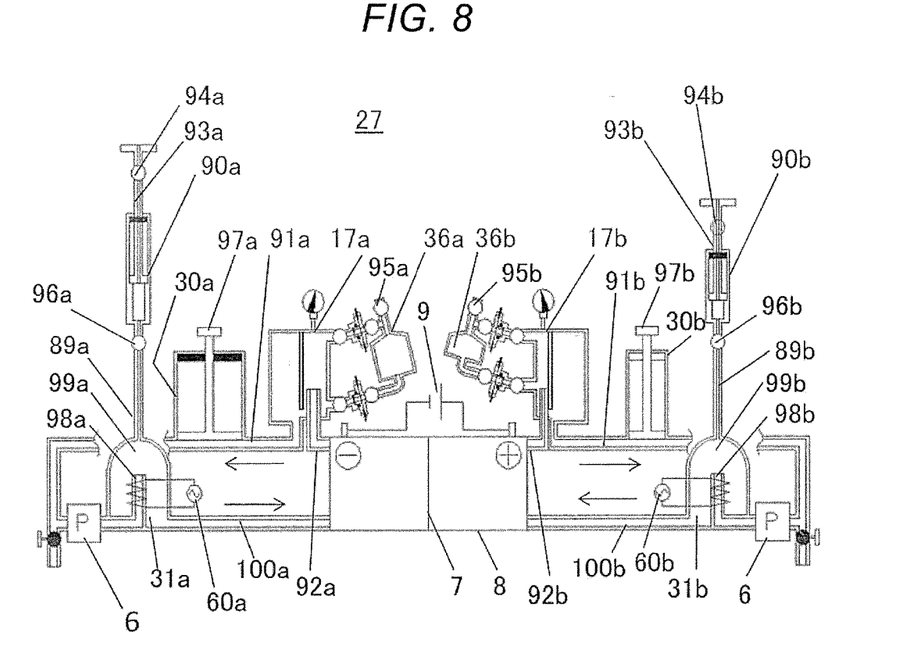
FIG. 8 shows a schematic diagram of a hydrogen/oxygen-producing apparatus according to a third embodiment.

FIG. 8 is a schematic diagram of a hydrogen/oxygen-producing apparatus 27 according to the third embodiment.

<General Configuration>

In FIG. 8, the hydrogen/oxygen-producing apparatus 27 according to the third embodiment mainly includes: an electrolysis cell 8; gas-liquid separation devices 17a and 17b; storage tanks 36a and 36b; buffer cylinders 30a and 30b; air-collecting units 31a and 31b; and depressurizing cylinders 90a and 90b.

<Whole Process>

In FIG. 8, pure water injected from the storage tanks 36a and 26b passes through gas-liquid separation devices 17a and 17b and pipes 91a and 91b, and reaches air-collecting units 31a and 31b.

Then, the pure water passes through the electrolysis cell 8 and further pipes 92a and 92b, and is delivered back to the gas-liquid separation devices 17a and 17b by action of a pump 6.

Buffer cylinders 30a and 30b are placed on the pipes 91a and 91b, respectively, at positions coming into contact with side surfaces of the pipes.

Furthermore, depressurizing cylinders 90a and 90b are placed above air-collecting units 31a and 31b. When the injection of pure water is continued as described above, all the air remaining in a region of the hydrogen/oxygen-producing apparatus 27 in which pure water can circulate is released from hollow rods 93a and 93b of the depressurizing cylinders 90a and 90b to the outside.

Then, when valves 94a and 94b as well as valves 95a and 95b are closed, the pure water is blocked from the outside air, and only the insides of depressurizing cylinders 90a and 90b are in contact with the remaining air.

When pure water is heated by heaters 60a and 60b of the air-collecting units 31a and 31b in that state, air solubility of the pure water decreases, and the air dissolved in the pure water obviously appears as a gas. The pure water that has obviously appeared as a gas moves above the air-collecting units 31a and 31b, and is collected inside the above depressurizing cylinders 90a and 90b. The volumes of the collected air increase, and, simultaneously, the hollow rods 93a and 93b are lifted up. When this lifting up of the hollow rods 93a and 93b is discontinued, then, hollow rods 93a and 93b of depressurizing cylinders 90a and 90b are forcibly lifted up to increase volumes of the insides of depressurizing cylinders 90a and 90b, thus depressurizing the air remaining inside the depressurizing cylinders 90a and 90b. According to this depressurizing manipulation, the air dissolved in the pure water is further caused to obviously appear as a gas, and is collected inside the depressurizing cylinders 90a and 90b. In this state, the valves 96a and 96b are closed, thereby realizing a sealed state in which the amount of air dissolved in the pure water is quite small and the pure water is not in contact with any gases.

When, in such a manner in which the pure water in the closed state circulates, a direct-current voltage is applied to the positive and negative electrodes of the electrolysis cell 8 by means of a power-supply device 9, oxygen and hydrogen produces from positive and negative electrodes, respectively, of the electrolysis cell 8. These oxygen and hydrogen pass through pipes 92a and 92b in the streams of pure water, while they are contained in the pure water, and are delivered to the gas-liquid separation devices 17a and 17b. In this case, rods 97a and 97b of the buffer cylinders 30a and 30b are lifted up in the vertical direction (upward direction in the figure), thereby increasing internal volumes of the buffer cylinders 30a and 30b, and, consequently, volumes of pure water equivalent to volumes of produced hydrogen and oxygen are aspirated into the buffer cylinders 30a and 30b.

<Air-Collecting Units 31a and 31b, and Depressurizing Cylinders 90a and 90b>

In FIG. 8, the air-collecting units 31a and 31b include, respectively, pure water inlets 98a and 98b, pure water tanks 99a and 99b, pipes 89a and 89b, pipes 100a and 100b, and heaters 60a and 60b.

Upper edges of the above pure water inlets 98a and 98b are located in the vertical direction above the pipes 100a and 100b, respectively. The depressurizing cylinders 90a and 90b includes, respectively, valves 96a and 96b, hollow rods 93a and 93b, and valves 94a and 94b.

Immediately after injection of pure water, pure water supplied from a pump 6 is delivered from the pure water inlets 98a and 98b to the pure water tanks 99a and 99b, thereby releasing the air inside the pure water tanks 99a and 99b to the outside through the pipes 89a and 89b and the hollow rods 93a and 93b.

At that time, the pure water itself circulates from the pipes 100a and 100b to the electrolysis cell 8. In the pure water in that state, a volume of the air depending on a partial pressure of the air present in the atmosphere, and solubility determined by a temperature of the atmosphere is dissolved. Then, when the pure water inside the pure water tanks 99a and 99b is heated by means of heaters 60a and 60b, solubility of the air in the pure water decreases, and therefore, the air obviously appears as a gas. The air that has obviously appeared in the pure water moves up in the pure water tanks 99a and 99b due to its buoyance, and is released to the outside through the pipes 89a and 89b and the hollow rods 93a and 93b.

In this manner, after the air dissolved in the pure water is removed by way of heating, the valves 94a and 94b are closed, the hollow rods 93a and 93b are lifted up by means of an external force (not shown in the figure), thereby increasing internal volumes of the depressurizing cylinders 90a and 90b, and thus, pressures of the internal air are decreased. When the pressures are decreased, the air dissolved in the pure water further obviously appeared as a gas, and is collected inside the depressurizing cylinders 90a and 90b.

In this state, when the valves 96a and 96b are closed, a condition in which the pure water circulates in a closed state where the air dissolved in the pure water is removed therefrom by way of both heating and depressurizing and where the pure water is not in contact with any gases is realized.

Upper edges of the above pure water inlets 98a and 98b are located in the vertical direction above the pipes 100a and 100b, respectively. This makes it possible for the pure water to flow through the insides of the pure water tanks 99a and 99b and to then flow into the pipes 100a and 100b. Any gases can certainly be removed inside the pure water tanks 99a and 99b.

<Buffer Cylinders 30a and 30b>

In FIG. 8, the buffer cylinders 30a and 30b are located downstream of the gas-liquid separation device 17a and 17b, respectively, in flowing directions of the pure water (arrows in FIG. 8). The pure water is in a condition in which the dissolved water is removed therefrom and the pure water circulates in a closed state where the pure water is not in contact with any gases. When, in this state, a direct-current voltage is applied to positive and negative electrodes of the electrolysis cell 8 by means of a power-supply device 9, hydrogen and oxygen produce from pipes 92a and 92b, respectively.

These hydrogen and oxygen are collected in upper parts of gas-liquid separation devices 17a and 17b and upper parts of storage tanks 36a and 36b, respectively. Volumes of pure water equivalent to volumes of produced hydrogen and oxygen pass through gas-liquid separation devices 17a and 17b, further pass through pipes 91a and 91b via upper parts of storage tanks 36a and 36b, and flow into the buffer cylinders 30a and 30b, respectively.

At that time, the pure water flowed thereinto lifts up the rods 97a and 97b. The molar ratio of hydrogen and oxygen produced by the water electrolysis reaction in the electrolysis cell 8 is 2/1. Therefore, volume ratios of gas-liquid separation devices 17a and 17b, and storage tanks 36a and 36b and buffer cylinders 30a and 30b, respectively, were adjusted to 2/1, thereby causing the volume ratio of collected hydrogen and oxygen to be 2/1, i.e., causing the pressure of the hydrogen to be equal to the pressure of the oxygen. This makes it possible not to cause any pressure difference in an electrolyte membrane 7 that separates a hydrogen-production-side flow channel and an oxygen-production-side flow channel inside the electrolysis cell 8, and, consequently, breakage of the electrolyte membrane 7 due to the pressure difference can be prevented.

In addition, the gas-liquid separation devices 17a and 17b in the first or second embodiment can be used in this embodiment.

<As a Whole>

Embodiments can be combined. The buffer cylinders 30a and 30b, as well as the air-collecting units 31a and 31b in the third embodiment may be used in the first or second embodiment.

Additionally, the tanks 2a and 2b in the first and second embodiments are not essential elements. As found in the third embodiment, the water tanks 2a and 2b may be omitted, and the gas-liquid separation devices 17 and the electrolysis cell 8 may be connected with one another. When the water tanks 2a and 2b are present, they serve as buffers, and therefore, the presence of water tanks 2a and 2b is preferable.

The hydrogen/oxygen-producing apparatus according to the various embodiments can be utilized as an apparatus that supplies hydrogen or oxygen.

What is claimed is:

1. A gas-producing apparatus that produces hydrogen or oxygen, comprising:
   an electrolysis cell that produces hydrogen and oxygen through electrolysis of water; and
   a gas-liquid separation device that is connected to the electrolysis cell and that receives the water and the hydrogen or the oxygen, wherein
   the gas-liquid separation device includes a first chamber and a second chamber, the first chamber and the second chamber are separated by a partition wall, and a lower part of the first chamber and a lower part of the second chamber communicate with one another,
   wherein, in a first pipe that allows the electrolysis cell to communicate with the first chamber, an upper edge of the first pipe is located above a communicating part in which the lower part of the first chamber communicates with the lower part of the second chamber,
   further comprising a storage tank that stores hydrogen or oxygen, wherein the storage tank communicates with the first chamber at two connecting parts in a vertical direction of the first chamber.

2. The gas-producing apparatus according to claim 1, wherein a valve that can be opened to outside is provided on an upper part of the second chamber.

3. The gas-producing apparatus according to claim 1, further comprising a water tank that is connected to the electrolysis cell and that supplies the water to the electrolysis cell.

4. The gas-producing apparatus according to claim 1, wherein a second pipe that delivers the water to the water tank is provided below the second chamber.

5. The gas-producing apparatus according to claim 1, further comprising a buffer cylinder that is connected to the gas-liquid separation device.

6. The gas-producing apparatus according to claim 1, further comprising an air-collecting device that is connected to the electrolysis cell.

7. A gas-producing method, comprising:
   in a gas-liquid separation device including a first chamber and a second chamber that are separated by a partition wall, communicating the lower part of the first chamber and the lower part of the second chamber, filling lower parts of the first chamber and the second chamber, and a storage tank that stores hydrogen or oxygen, with water, to trap air inside an upper part of the second chamber;

receiving, in the first chamber, by a first pipe that allows an electrolysis cell to communicate with the first chamber and an upper edge of which is located above a communicating part in which the lower part of the first chamber communicates with the lower part of the second chamber water including hydrogen or oxygen from an electrolysis cell to collect the hydrogen or the oxygen in an upper part of the first chamber and in an upper part of the storage tank communicated with the first chamber at two connecting parts in a vertical direction of the first chamber and filling the storage tank with the hydrogen or the oxygen.

8. The gas-producing method according to claim 7, where the hydrogen or the oxygen is collected in the upper part of the first chamber and the upper part of the storage tank, and the air is compressed by the water, based on an increase in the volume of the collected hydrogen or oxygen, thereby increasing pressure of the hydrogen or the oxygen in the upper part of the first chamber and in the upper part of the storage tank.

* * * * *